United States Patent
Tanaka et al.

[11] Patent Number: 5,932,931
[45] Date of Patent: Aug. 3, 1999

[54] VEHICLE WINDOW CONTROL SYSTEM RESPONSIVE TO EXTERNAL FORCE

[75] Inventors: Takeshi Tanaka, Toyohashi; Noboru Tsuge, Kariya; Hidenori Ishihara, Hamamatsu; Tsutomu Saito, Toyohashi, all of Japan

[73] Assignee: Asmo Co., Ltd., Shizuoka, Japan

[21] Appl. No.: 09/033,091

[22] Filed: Mar. 2, 1998

[30] Foreign Application Priority Data

Mar. 3, 1997 [JP] Japan ................................. 9-048079
Jul. 24, 1997 [JP] Japan ................................. 9-198837

[51] Int. Cl.$^6$ ............................................. G05G 5/04
[52] U.S. Cl. ................... 307/10.1; 318/69; 318/280; 318/283; 318/286; 318/445; 318/466; 318/264; 49/28; 200/61.42; 200/64.43
[58] Field of Search ........................... 307/10.1; 318/280, 318/283, 286, 445, 69, 264, 265; 301/23; 49/28, 349; 200/61.42, 61.43

[56] References Cited

U.S. PATENT DOCUMENTS

| | | | |
|---|---|---|---|
| 3,727,348 | 4/1973 | Steinmann et al. | 49/28 |
| 4,746,845 | 5/1988 | Mizuta et al. | 318/286 |
| 5,585,705 | 12/1996 | Brieden | 318/286 |
| 5,613,322 | 3/1997 | Kobrehel | 49/349 |
| 5,801,501 | 9/1998 | Redelberger | 318/283 |
| 5,872,436 | 2/1999 | Bergmann et al. | 318/286 |

FOREIGN PATENT DOCUMENTS

| | | |
|---|---|---|
| 60-78082 | 5/1985 | Japan . |
| 7-4137 | 1/1995 | Japan . |

*Primary Examiner*—Albert W. Paladini
*Attorney, Agent, or Firm*—Burns, Doane, Swecker & Mathis, LLP

[57] ABSTRACT

When a closing end of a vehicle windowpane is located at the upper side of a preset point P1 while the windowpane is closing, an obstacle pinched between a window frame and the windowpane is detected by a window frame sensor. When the closing end of the vehicle window is located at the lower side of a preset point P2, the pinched obstacle is detected by the window frame sensor and a motor rotation speed sensor, which indicates changes in motor driving load. This prevents a vehicle window control system from operating erroneously when an obstacle is pinched at a slope portion of the window frame.

11 Claims, 3 Drawing Sheets

5,932,931

VEHICLE WINDOW CONTROL SYSTEM RESPONSIVE TO EXTERNAL FORCE

CROSS REFERENCE TO RELATED APPLICATION

This application relates to and incorporates herein by reference Japanese Patent Application Nos. 9-48079 filed on Mar. 3, 1997, and 9-198837 filed on Jul. 24, 1997.

BACKGROUND OF THE INVENTION

1. Field of the Invention

The present invention relates to a vehicle window control system (power window) which opens and closes a vehicle windowpane automatically by an electric motor, and has a mechanism for restricting a motion of the vehicle windowpane when an obstacle is pinched between a vehicle window frame and the vehicle windowpane.

2. Related Art

A conventional power window includes a motor driving load detector for detecting a driving load of an electric motor, which drives a vehicle windowpane, or a window frame sensor for detecting an external force exerted on a vehicle window frame, or the like. When a detected driving load or external force exceeds a predetermined value indicative of an obstacle pinched between the window frame and the windowpane, the windowpane is driven in reverse in the window opening direction.

When an obstacle is pinched between the window frame and the windowpane, an external force exerts on both the window frame and the windowpane. Therefore, if the power window has only either the motor driving load detector or the window frame sensor, the power window may operate erroneously when an external force exerts on the window frame or the windowpane by an intentional action such as a mischief. To overcome the erroneous operation, JP-A-7-4137 proposes to use both the motor driving load detector and the window frame sensor so that the windowpane is driven in reverse only when both the detected driving load and the external force exceed the predetermined values.

In the power window according to JP-A-7-4137, the windowpane may not be driven in reverse even when an obstacle is pinched between the window frame and the windowpane depending on a pinching point of the obstacle.

As shown in FIG. 4, a window frame 2 has a slope portion 2a which is inclined to the moving direction of a windowpane 4. When an obstacle 10 is pinched at the slope portion 2a, an external force F0 exerts on the obstacle (window frame). An F0's component force F1 which is perpendicular to the slope portion 2a exerts on the windowpane 4. A driving load of an electric motor is substantially the same as an F1's component force $F3(=F0 \cos^2\theta)$ which is toward the window closing direction.

Therefore, when the obstacle 10 is pinched at the slope portion 2a exerting an external force F0 on the obstacle 10 (window frame 2), the component force F3 which exerts on the electric motor as the driving load is smaller than the component force F3 which exerts on the electric motor when the same obstacle is pinched at the window frame 2 other than the slope portion 2a. That is, when the obstacle 10 is pinched at the slope portion 2a, the motor load detector can not detect the pinched obstacle 10 unless an external force exerted on the slope portion 2a exceeds F0. As shown in FIGS. 5A and 5B, the external force F0 required for reversing rotation of the electric motor is larger at points (b) and (c) of the slope portion 2a than other points (a) and P.

Further, because the component force F3 exerted on the electric motor as the driving load is small at the slope portion 2a, it is difficult for the motor driving load detector to distinguish driving load detection errors and changes in driving load, which is caused by the pinched obstacle 10. This results in increase in a ratio of the detection error to the detected driving load. Therefore, when the obstacle 10 is pinched at the slope portion 2a of the window frame 2, the power window operates erroneously due to the increase of the detection error of the detected driving load.

SUMMARY OF THE INVENTION

It is a first object of the present invention to provide a vehicle window control system which restricts a motion of a vehicle windowpane upon detection of an obstacle properly even when the obstacle is pinched at a slope portion of a window frame.

According to the present invention, if an external force exerted on a window frame exceeds a predetermined value when a windowpane is located at a window closing side of a first preset point P1, the windowpane is restricted from closing. If a driving load of an actuator exceeds a predetermined value when the windowpane is located at the window opening side of a preset point P2, the windowpane is restricted from closing. Accordingly, even when an obstacle is pinched at a slope portion of a window frame, erroneous operation due to driving load detection error is reduced.

Preferably, the first and second preset points P1 and P2 are located below the window frame at a distance of a dimension of an obstacle ranging from a child's finger to an adult's wrist.

BRIEF DESCRIPTION OF THE DRAWINGS

These and other objects and features of the present invention will become more readily apparent from a better understanding of the preferred embodiments described below with reference to the accompanying drawings, in which.

DETAILED DESCRIPTION OF THE PREFERRED EMBODIMENTS (First Embodiment)

Figure 1A:
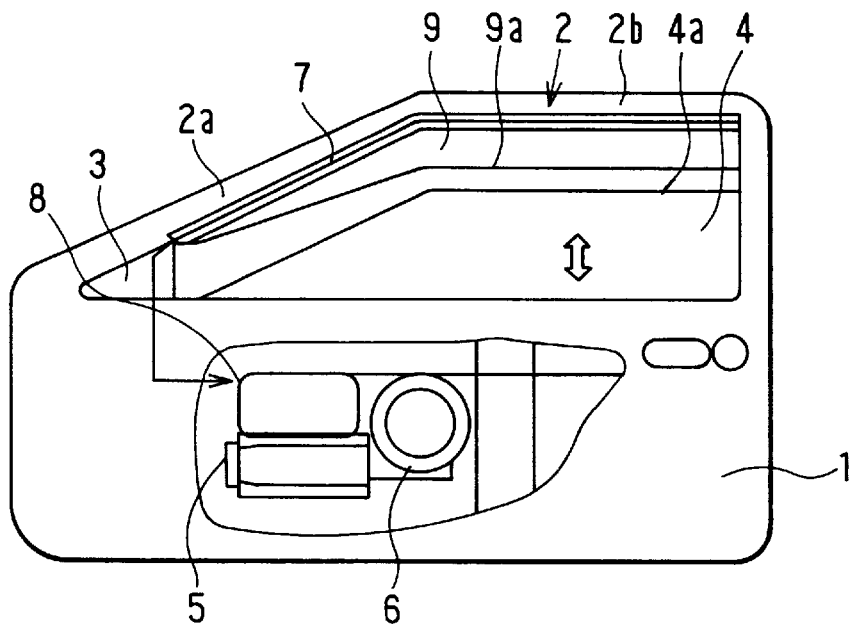
FIG. 1A is a schematic view showing a vehicle door to which a first embodiment and a second. embodiment of the invention are applied.

Referring to FIG. 1A, a vehicle door 1 includes a window frame 2 which surrounds a window opening 3. A windowpane 4 is held movably within the window opening 3 to open and close the window opening 3. The windowpane 4 is driven by an electric motor 5 which is powered by a battery (not shown). When the windowpane 4 is fully closed, a top end 4a of the windowpane 4 contacts with the window frame 2. A rotation speed sensor 6 detects a rotation speed (rotation angle) of the electric motor 5. The window frame 2 includes a slope portion 2a, which is inclined to the window moving direction, and an upper portion 2b, which is substantially horizontal, and perpendicular to the window moving direction shown by an arrow in FIG. 1A. A window frame sensor 7 is provided along the slope portion 2a and the upper portion 2b of the window frame 2. Detection signals output from the rotation speed sensor 6 and the window frame sensor 7 are input to an electronic control circuit 8 which in turn controls the electric motor 5. A side visor 9 made of resin is disposed at the exterior of a vehicle, and covers the slope portion 2a and the upper portion 2b of the window frame 2. A bottom end 9a of the side visor 9 is the end which is not attached to the window frame 2.

Figure 2A:
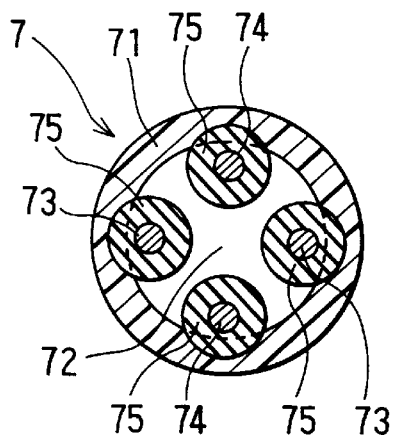
FIG. 2A is a cross-sectional view of a window frame sensor used in the first and second embodiments.
Figure 2B:
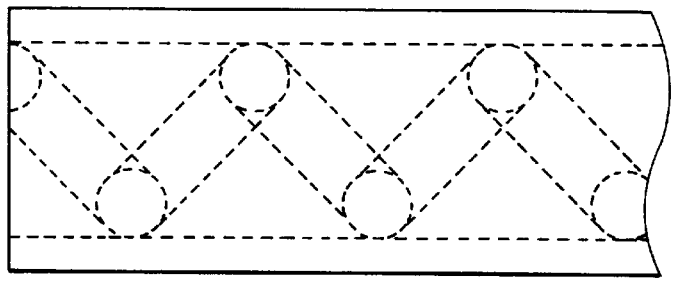
FIG. 2B is a schematic side view of the window frame sensor used in the first and second embodiments.

As shown in FIGS. 2A and 2B, the window frame sensor 7 includes a tube 71 made of an insulating material (e.g., rubber) which is elastically deformable. Within the tube 71, first and second electrodes 73 and 74 made of metal are disposed diagonally in an inside opening 72. The first and second electrodes 73 and 74 are held insulated from each other normally and extend spirally in the longitudinal direction of the tube 71. The first and second electrodes 73 and 74 are coated by a coating material 75 made of conductive rubber or conductive resin (i.e., metal-added rubber or resin). When an external force exerted on the tube 71 (window frame 2) exceeds a predetermined value, the first and second electrodes 73 and 74 contact each other to provide conductivity therebetween, and produce a window frame detection signal 7a to the control circuit 8.

Figure 1B:
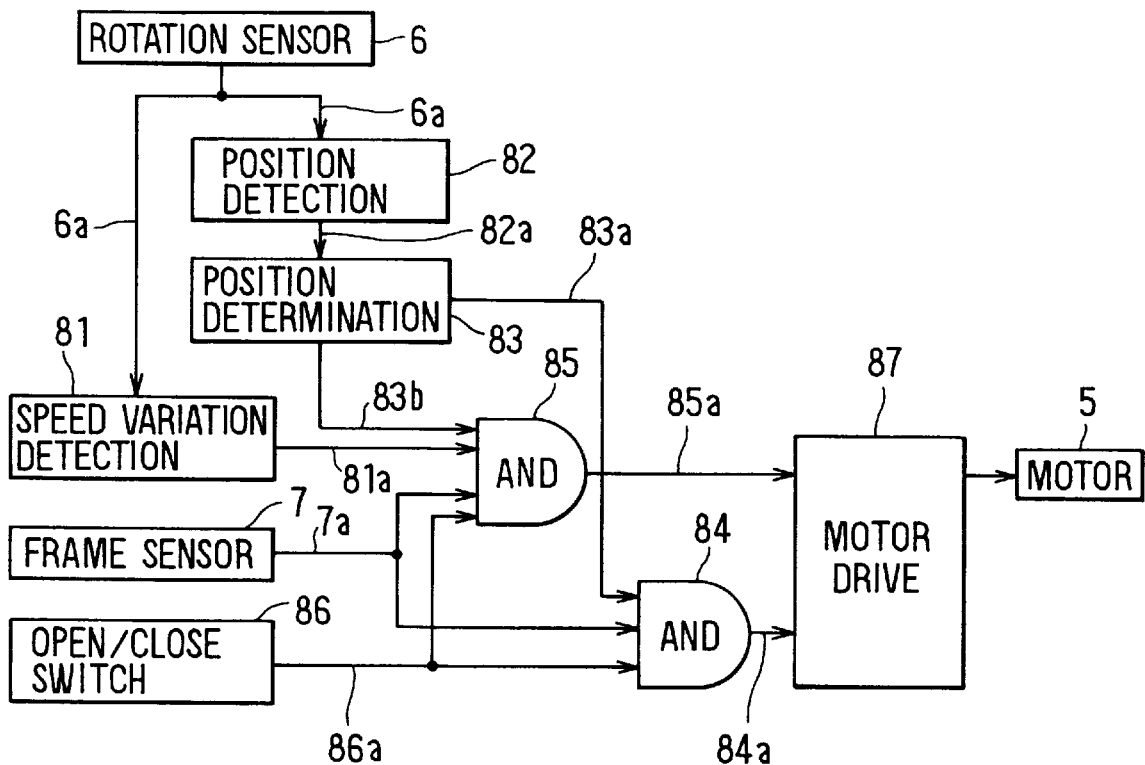
FIG. 1B is a block diagram showing a control circuit used in the first embodiment.

The control circuit 8 is constructed as shown in FIG. 1B and operates as follows.

The rotation speed sensor 6 detects a rotation speed of the electric motor 5 and inputs a rotation speed detection signal 6a to a speed variation rate detection circuit 81 which detects a variation rate in rotation speed of the electric motor 5 according to the rotation speed detection signal 6a, and a window position detection circuit 82 which detects the position of the top end 4a of the windowpane 4 (window position) according to the rotation speed detection signal 6a.

A window position detection signal 82a output from the window position detection circuit 82 is input to a window position determination circuit 83 which determines whether the windowpane 4 has reached the preset point or not. When the window position determination circuit 83 determines that the window position is on the window closing side of the first preset point P1, a first point signal 83a is output to a first AND gate 84. When the window position determination circuit 83 determines that the window position is on the window opening side of the second preset point P2, a second point signal 83b is output to a second AND gate 85.

When the variation rate in rotation speed of the electric motor 5 exceeds a predetermined value, that is, the moving speed of the windowpane 4 falls unusally, indicating that the driving load of the electric motor 5 exceeds a predetermined value, the speed variation rate detection circuit 81 outputs a speed variation rate detection signal 81a to the second AND gate 85.

When a vehicle passenger instructs to close the windowpane 4 using an open/close command switch 86, a closing signal 86a is output from the open/close command switch 86. The window frame detection signal 7a from the window frame sensor 7 and the closing signal 86a from the open/close command switch 86 are input to both AND gates 84 and 85.

AND gate output signals 84a and 85a which are output from the AND gate 84 and 85 respectively are input to a motor drive circuit 87, which controls the rotation of the electric motor 5. The electric motor 5 may be driven in reverse by reversing a polarity of power supply to the motor 5.

In this embodiment, the second preset point P2 is located at the window closing side of the first preset point P1 to prevent erroneous operation due to detection errors of the rotation speed sensor 6 or the window position detection sensor 82. However, as the first and second preset points P1 and P2 are very close to each other and the rotation speed sensor 6 and the window position detection sensor 82 produce detection errors, the first and second preset points P1 and P2 may be set at substantially the same point.

According to the above embodiment, when the windowpane 4 has passed the first preset point P1 while closing, and the window frame detection signal 7a is output from the window frame sensor 7, indicative of pinching of an obstacle at either the slope portion 2a and the upper portion 2b, the electric motor 5 rotates in reverse and the windowpane 4 starts opening irrespective of the speed variation rate detection signal 81a, indicative of the excessive load on the electric motor 5. When the window position of the windowpane 4 is on the window opening side of the second preset point P2, and the window frame detection signal 7a and the speed variation rate detection signal 81a are output from the window frame sensor 7 and the speed variation rate detection circuit 81 respectively, indicative of pinching of an obstacle at the upper portion 2b, the electric motor 5 rotates in reverse and the windowpane 4 starts opening.

Here, a distance between the preset points P1 or P2 and the window frame 2 is determined to be equivalent to a size of an obstacle ranging from a child's finger to an adult's wrist. If a pinched obstacle is detected only by the window frame sensor 7 while the window position is located at the window closing side (upper side) of the preset point P1, the obstacle can be detected properly even when the obstacle is pinched at the slope portion 2a, because the speed variation rate detection signal 81a, which indicates the detected driving load of the electric motor 5 including a comparatively large detection error, does not affect the detection of the pinched obstacle. This assures motor reversing operation when an object is pinched at the slope portion 2a of the window frame 2.

On the other hand, while the window position is located at the window opening side (lower side) of the preset point P2, an obstacle is detected by both the window frame sensor 7 and the speed variation rate detection circuit 81 to prevent the power window from operating erroneously due to an external force caused by mischievous intentional action.

Obstacle pinching conditions differ depending on whether the side visor 9 is provided on the vehicle or not. Even when the first and second preset points P1 and P2 are located at the same level as the bottom end 9a of the side visor 9, or located above the bottom end 9a, the pinching of the vehicle internal obstacle can be detected. The preset points P1 and P2 can also be located below the bottom end of the side visor 9. Further, although the preset points P1 and P2 are located at the different positions in this embodiment, the preset points P1 and P2 may be located at the same position.

(Second Embodiment)

Figure 3:
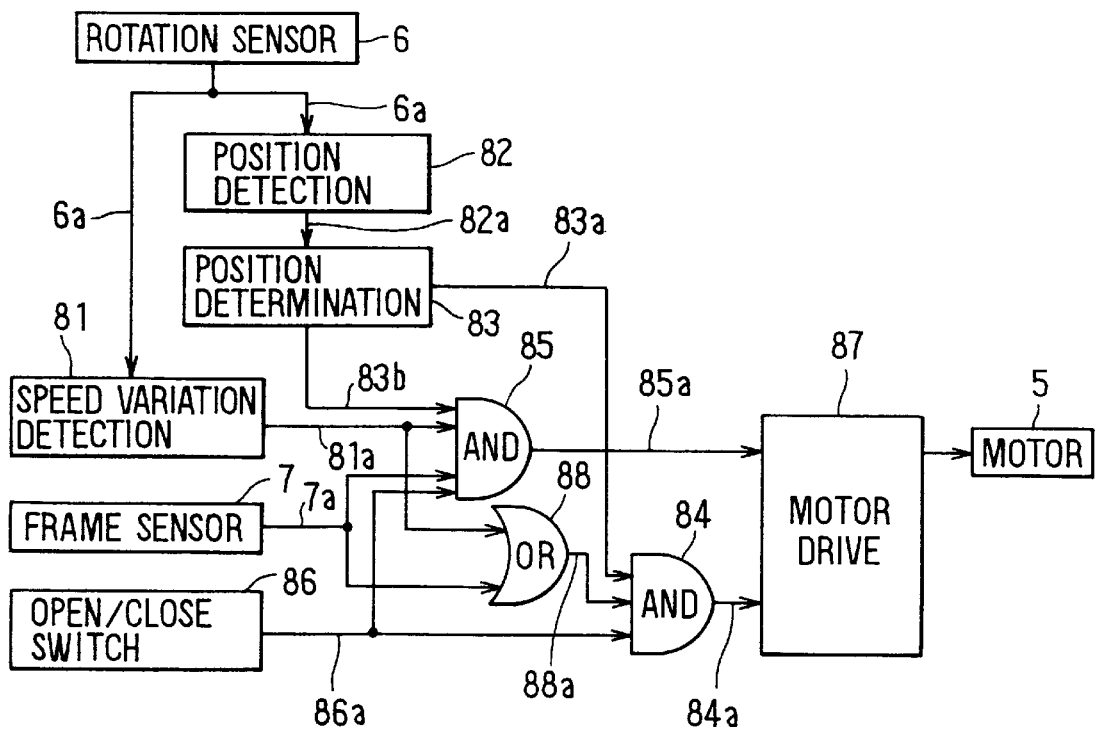
FIG. 3 is a block diagram showing a control circuit used in the second embodiment.
Figure 4:
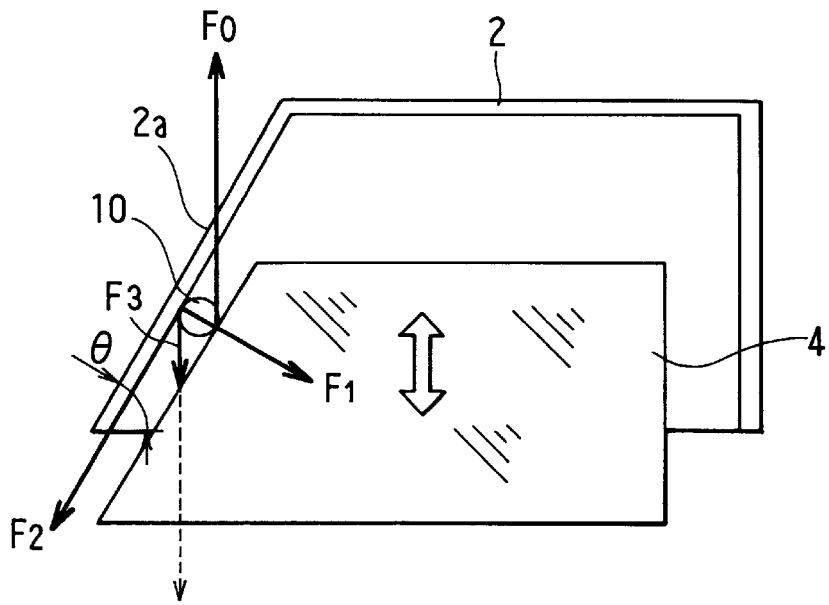
FIG. 4 is a schematic view illustrating an obstacle pinched at a slope portion in a vehicle window.
Figure 5A:
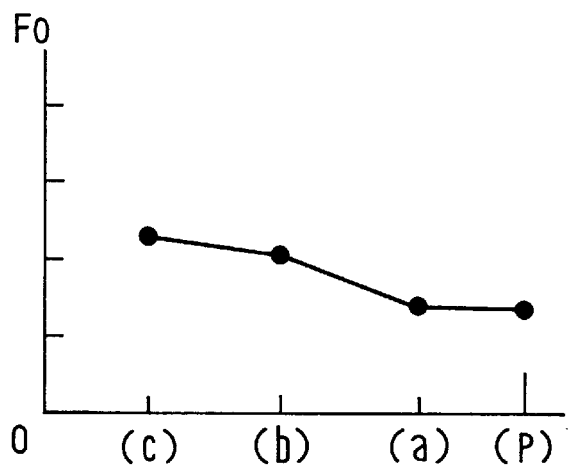
FIG. 5A is a graph showing an external force F0 at points (a), (b), (c) and (P) on a window frame.
Figure 5B:
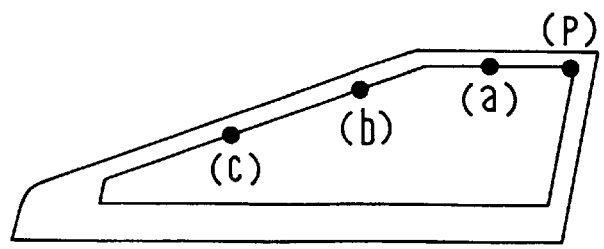
FIG. 5B is a schematic view showing the points (a), (b), (c) and (P) on the window frame.

In the second embodiment shown in FIG. 3, an OR gate 88a is provided in the control circuit 8 in addition to the circuit configuration shown in FIG. 1B. The speed variation rate detection circuit 81 outputs the detection signal 81a to the OR gate 88 as well as to the second AND gate 85. Further, the window frame sensor detection signal 7a is input to the OR gate 88 as well as to the second AND gate 85. An output signal 88a from the OR gate 88 is input to the first AND gate 84.

Thus, if either the window sensor detection signal 7a or the speed variation rate detection signal 81a is output when the window position is on the window closing side of the preset point P1 while the windowpane 4 is closing, indicating that an obstacle is pinched, the electric motor rotates in reverse to open the windowpane 4.

In this embodiment, the preset points P1 and P2 are located below the bottom end of the side visor 9, that is, the preset points P1 and P2 are located lower than in the first embodiment. Therefore, the pinching of an obstacle pinched between the side visor 9 and the windowpane 4 can also be detected. Further, although the first and second preset points P1 and P2 are located at different positions in this embodiment, the first and second preset points P1 and P2 may be located at the same position.

Further, although the electric motor 5 is driven in reverse automatically when a pinched object is detected, the electric motor 5 may only stop rotation in the closing direction automatically when a pinched object is detected and then may rotate in reverse upon window opening instruction by the switch 86a. Furthermore, although the driving load of the electric motor 5 is detected by the speed variation rate of the windowpane 4, the driving load of the electric motor 5 may be detected by variation rate in driving current of the electric motor 5.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A vehicle window control system comprising:
   a window frame having a window opening, the window frame having a slope portion and an upper portion;
   a windowpane movable in the window opening;
   actuator means for moving the windowpane;
   driving load detector means for detecting a driving load of the actuator means;
   window frame sensor means disposed on the slope portion and the upper portion for detecting an external force exerted on the window frame;
   window position detector means for detecting a position of the windowpane;
   first control means for restricting a windowpane driving operation of the actuator means in response to at least a detection output of the window frame sensor means indicative of the external force in excess of a first predetermined value, when the detected window position is located at the window closing side of a first preset point P1; and
   second control means for restricting a windowpane driving operation of the actuator means in response to at least a detection output of the driving load detector means indicative of the driving load in excess of a second predetermined value, when the detected window position is located at the window opening side of a second preset point P2.

2. The control system of claim 1, wherein:
the first preset point P1 is located at the window opening side of the second preset point P2.

3. The control system of claim 1, wherein:
the first and second preset points P1 and P2 are substantially the same.

4. The control system of claim 1, further comprising:
a side visor having a bottom end disposed downward from the window frame; and
the first preset point P1 is located below the bottom end of the side visor.

5. The control system of claim 1, wherein:
the actuator means includes an electric motor to drive the windowpane;
the first control means rotates the electric motor in reverse to open the windowpane in response to the output of the window frame sensor means irrespective of the output of the driving load detector means; and
the second control means rotates the electric motor in reverse to open the windowpane in response to both outputs of the driving load detector means and the window frame sensor means.

6. The control system of claim 5, further comprising:
a side visor having a bottom end disposed downward from the window frame; and
the first preset point P1 is located below the bottom end of the side visor.

7. The control system of claim 1, wherein:
the actuator means includes an electric motor to drive the windowpane;
the first control means rotates the electric motor in reverse to open the windowpane in response to either one of the outputs of the window frame sensor means and the driving load detection means; and
the second control means rotates the electric motor in reverse to open the windowpane in response to both outputs of the driving load detector means and the window frame sensor means.

8. The control system of claim 7, further comprising:
a side visor having a bottom end disposed downward from the window frame; and
the first preset point P1 is located below the bottom end of the side visor.

9. A vehicle window control system comprising:
   a window frame having a window opening, the window frame having a slope portion and an upper portion;
   a windowpane disposed in the window frame and movable in the window opening;
   actuator coupled with the windowpane for moving the windowpane;
   driving load detector coupled with the actuator for detecting a driving load of the actuator;
   window frame sensor disposed on the slope portion and the upper portion for detecting an external force exerted on the window frame;
   window position detector operatively coupled with the actuator for detecting a position of the windowpane;
   a first controller coupled with the actuator for restricting a windowpane driving operation of the actuator in response to a detection output of either one of the window frame sensor or the driving load detector indicative of the external force or the driving load in excess of a respective predetermined value, when the detected window position is located at a window closing side of a first preset point P1; and
   a second controller coupled with the actuator for restricting the windowpane driving operation of the actuator in response to detection outputs of both the window frame sensor and the driving load detector indicative of the external force and the driving load in excess of respective predetermined values, when the detected window position is located at a window opening side of a second preset point P2.

10. A vehicle window control system comprising:

a window frame having a window opening, the window frame having a slope portion and an upper portion;

a windowpane disposed in the window frame and movable in the window opening;

actuator coupled with the windowpane for moving the windowpane;

driving load detector coupled with the actuator for detecting a driving load of the actuator;

window frame sensor disposed on the slope portion and the upper portion for detecting an external force exerted on the window frame;

window position detector operatively coupled with the actuator for detecting a position of the windowpane;

a first controller for restricting a windowpane driving operation of the actuator in response to a detection output of the window frame sensor indicative of the external force in excess of a first predetermined value, irrespective of the output of the driving load detector, when the detected window position is located at a window closing side of a first preset point P1; and a second controller coupled with the actuator for restricting a windowpane driving operation of the actuator in response to detection outputs of both the window frame sensor and the driving load detector indicative of the external force and the driving load in excess of respective predetermined values, when the detected window position is located at a window opening side of a second preset point P2.

11. A control method for a vehicle window control system having a window frame, a windowpane and an actuator, the method comprising the steps of:

detecting a driving load of the actuator;

detecting an external force exerted on the window frame;

detecting a position of the windowpane;

restricting a windowpane driving operation of the actuator in response to at least a detection output of the external force detecting step indicative of the external force in excess of a first predetermined value, when the detected window position is located at a window closing side of a first preset point P1; and restricting a windowpane driving operation of the actuator in response to at least a detection output of the driving load detecting step indicative of the driving load in excess of a second predetermined value, when the detected window position is located at a window opening side of a second preset point P2.

* * * * *